Oct. 29, 1929.  G. HORNECKER  1,733,803
DISPLAY BOX
Filed April 21, 1926    4 Sheets-Sheet 1
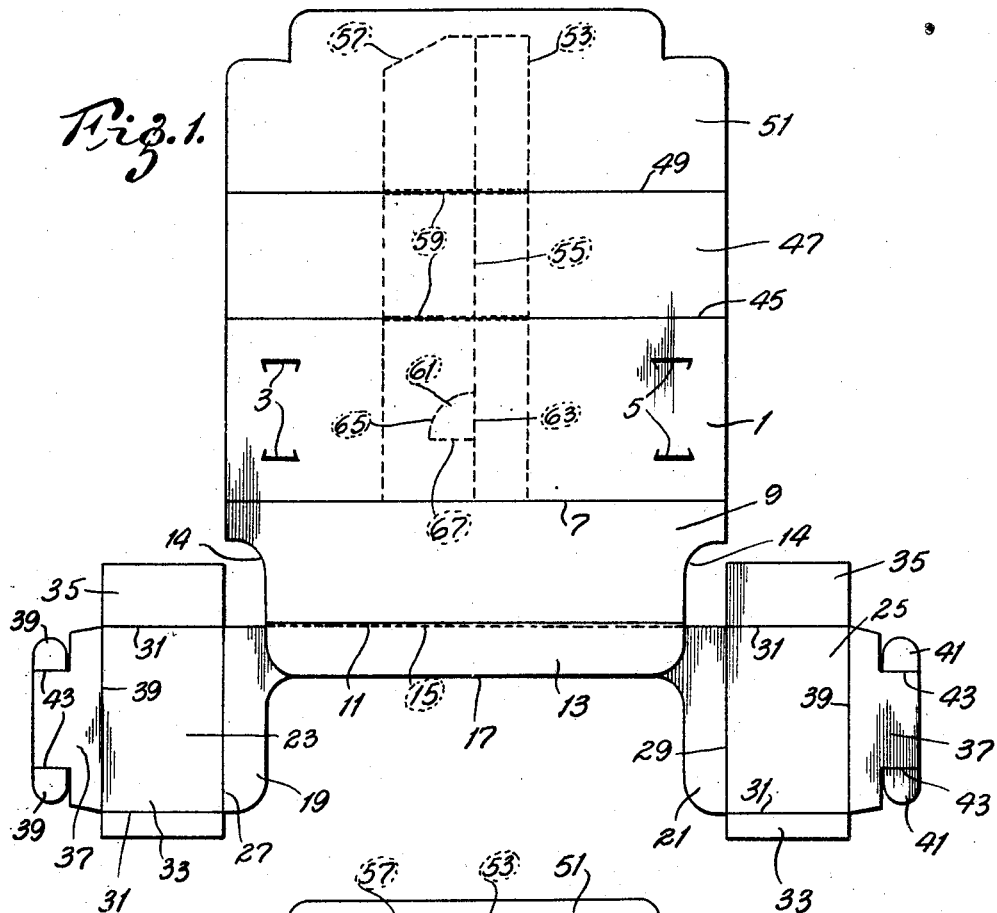
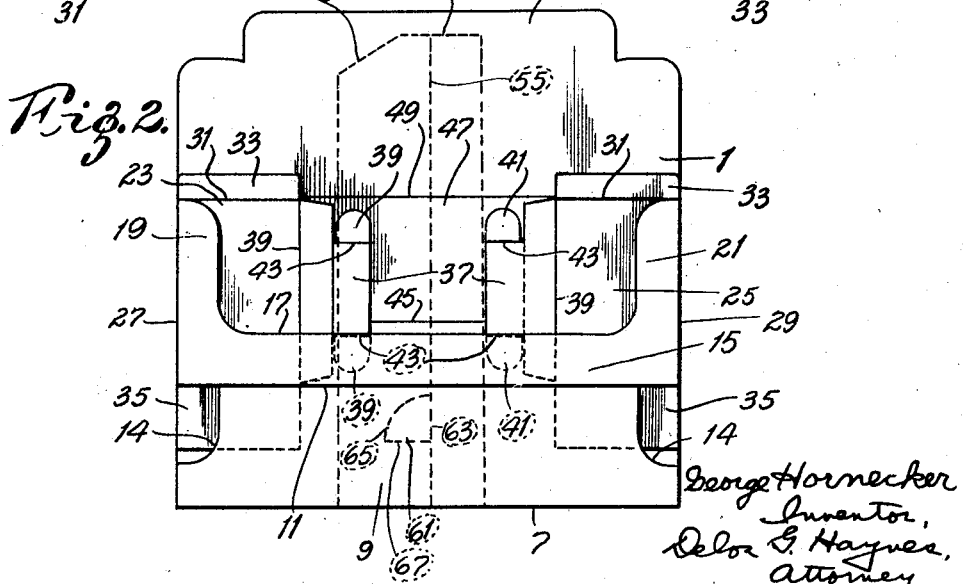

Oct. 29, 1929.  G. HORNECKER  1,733,803
DISPLAY BOX
Filed April 21, 1926  4 Sheets-Sheet 2
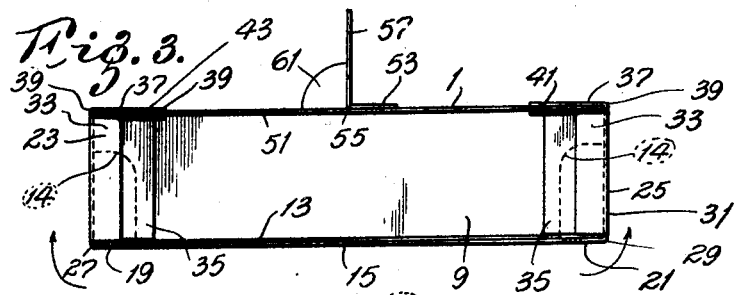
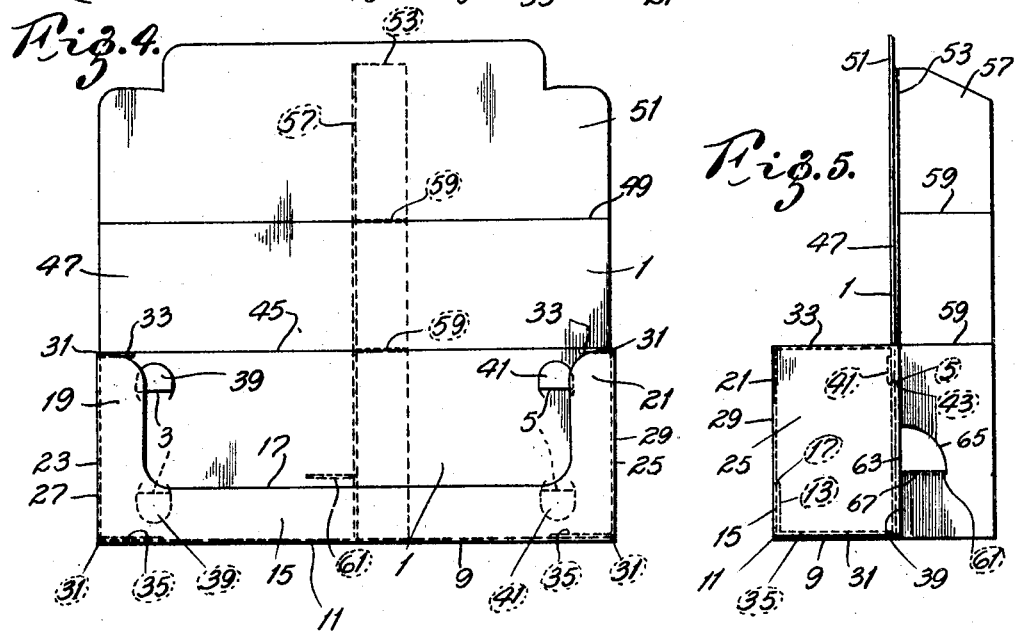
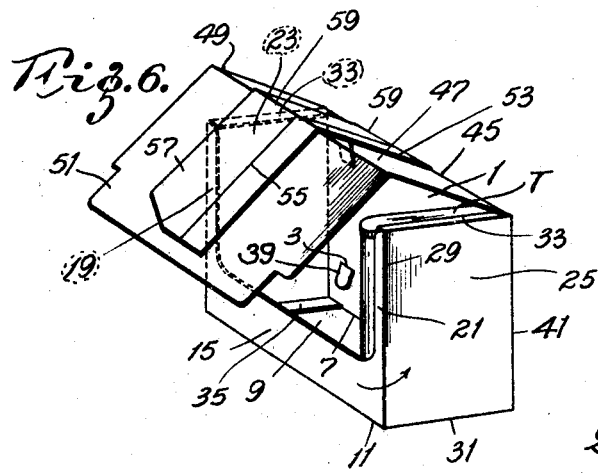

Oct. 29, 1929.  G. HORNECKER  1,733,803
DISPLAY BOX
Filed April 21, 1926  4 Sheets-Sheet 3
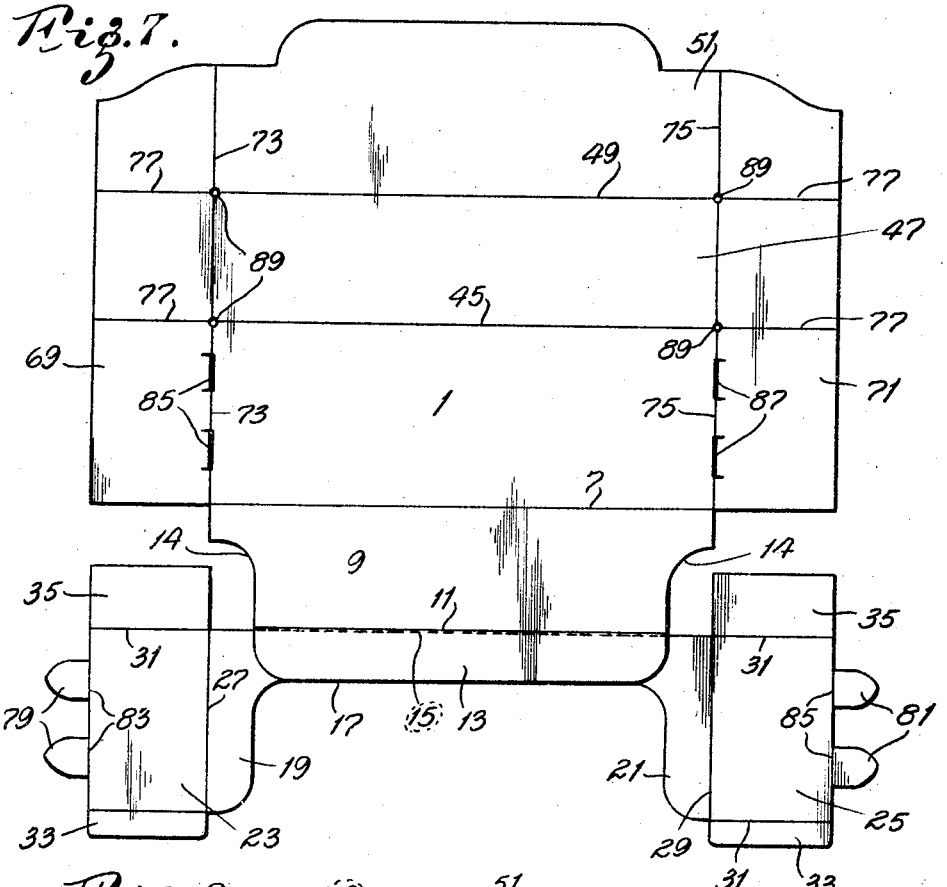
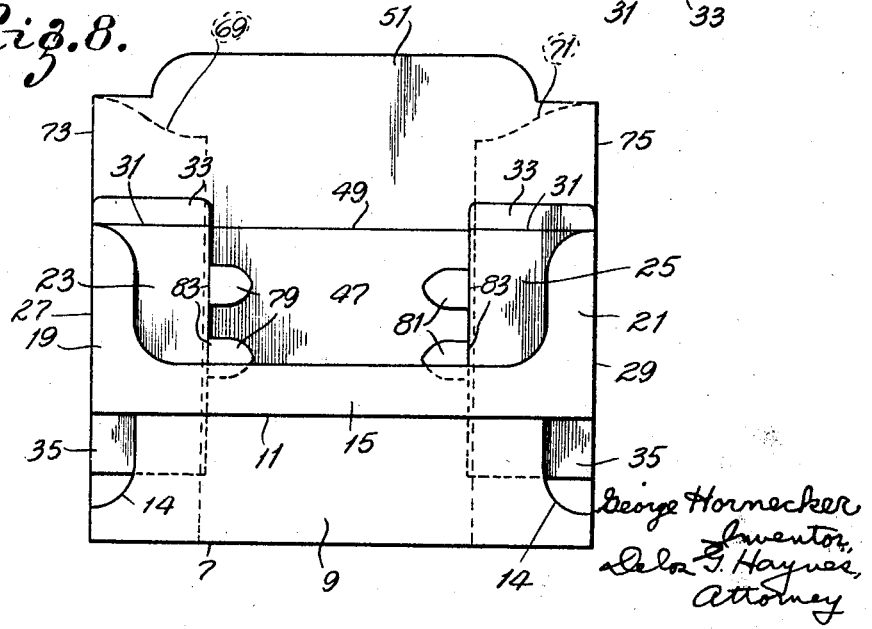

Oct. 29, 1929.  G. HORNECKER  1,733,803
DISPLAY BOX
Filed April 21, 1926   4 Sheets-Sheet 4
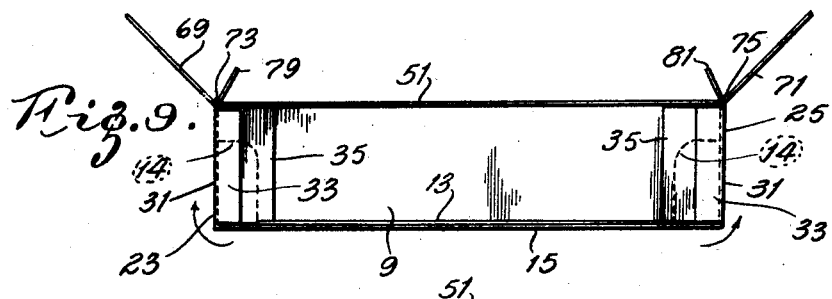
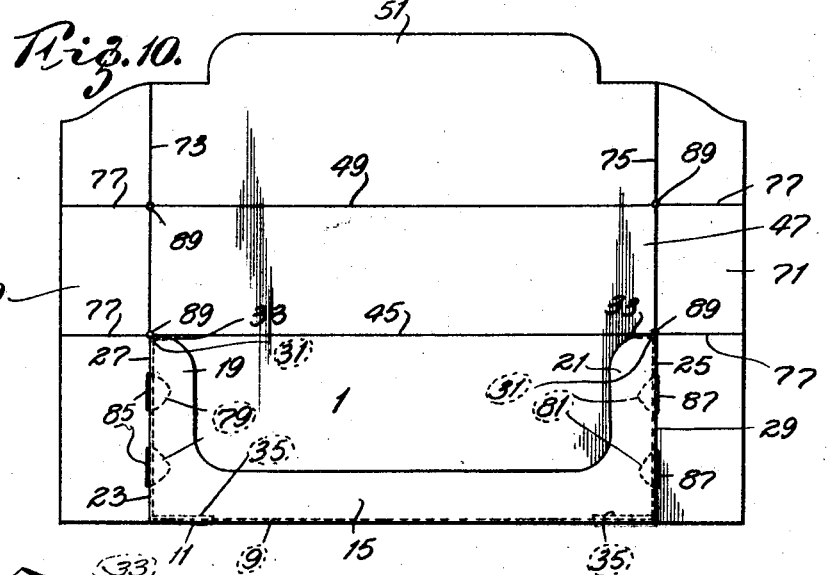
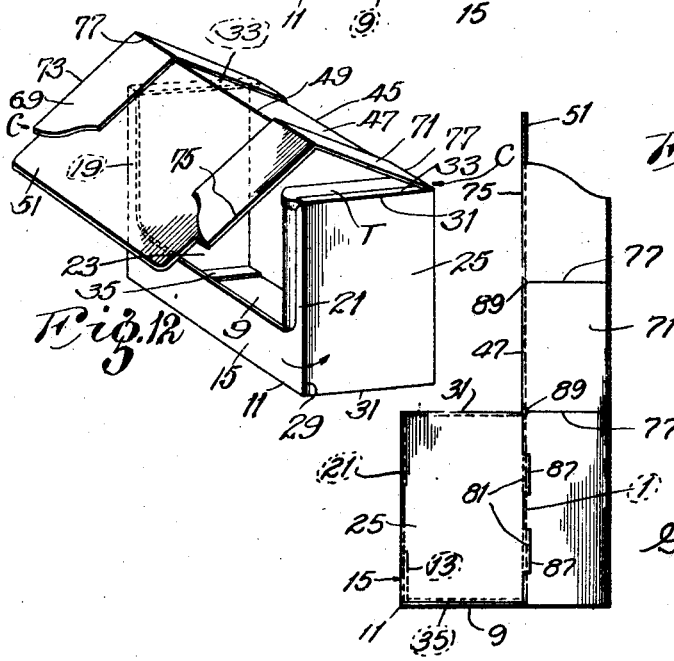

Patented Oct. 29, 1929

1,733,803

UNITED STATES PATENT OFFICE

GEORGE HORNECKER, OF ELMHURST, NEW YORK, ASSIGNOR, BY MESNE ASSIGNMENTS, TO CONWELL GRAPHIC COMPANY, INCORPORATED, OF NEW YORK, N. Y., A CORPORATION OF NEW YORK

DISPLAY BOX

Application filed April 21, 1926. Serial No. 103,450.

This invention relates to display devices and with regard to certain more specific features to a display box.

Among the several objects of the invention may be noted the provision of an open sided box for displaying goods packed therein; a box of the class described having display panels integrally formed therewith, the panels being provided with foldable stiffening elements whereby a maximum display area is afforded the provision of a display box such as described adapted to have said display panel and the stiffening elements therewith used as a protecting wrapper or closure for the box and its contents when shipped; and the provision of a device of the class described which is adapted to be economically fabricated. Other objects will be in part obvious and in part pointed out hereinafter.

The invention accordingly comprises the features of construction, combinations of elements and arrangements of parts, which are exemplified in the description hereinafter in connection with the accompanying drawings, and the scope of the application of which will be indicated in the following claims.

In the accompanying drawings, in which are illustrated two of various possible embodiments of the invention, Fig. 1 is a plan view of the preferred form of box in its unfolded position;

Fig. 2 is a plan view of the parts of Fig. 1 folded for flat shipment of the box to a wholesaler or the like;

Fig. 3 is a top plan view of the preferred form of box set up for display purposes but empty;

Fig. 4 is a front elevation of Fig. 3;

Fig. 5 is a right end elevation of Fig. 3;

Fig. 6 is a perspective view of the preferred form of box about to be closed to its wrapped position;

Figs. 7 and 8 are views similar to Figs. 1 and 2, but show a modified form of the box; and Figs. 9 to 12 are views similar to Figs. 3 to 6, showing the said modified form.

Similar reference characters indicate corresponding parts throughout the several views of the drawings.

Referring now more particularly to Fig. 1, there is illustrated at numeral 1 a back portion into which are cut sidewardly located pairs of receiving slots 3 and 5. Hinged downwardly to the back 1, along a crease line 7, is a bottom portion 9. A forwardly located crease 11 in said bottom hingedly holds a rail member 13, to the front of which member 13 is glued a second rail member 15 bent back along a score line 17. The said second rail 15 carries integrally in the plane thereof buttress elements 19 and 21. Previously to the scoring, bending and gluing of the rails as described, the buttresses 19 and 21 formed a portion of the bottom 9 and rail 13, but were relieved therefrom by curved incisions 14 which previously formed continuations of the score line 17. Hence the folding and gluing operation could be performed with regard to the rails 13 and 15.

The buttresses 19 and 21 carry end panels 23 and 25 respectively, hinged along creases 27 and 29. The panels have hingedly formed therewith, along crease lines 31, stiffening and closing flaps 33 and 35. Flaps 37 for closing, stiffening and interlocking purposes are also hinged to said end panels along creases 39. These flaps 37 are provided with laterally extending pairs of tongues 39 and 41, hinged on creases 43 and adapted to cooperate with the said slots 3 and 5 respectively when the proper folds (to be described) are made.

Hinged upwardly to the back 1, along a crease 45 is a cover panel 47, and hinged upwardly on said panel 47, along a crease 49 is a closure panel 51.

All of the elements so far described are die-cut and creased from a single piece. The upper surface (Fig. 1) of panels 47 and 51 may be lithographed or otherwise provided with display or advertising material for purposes to be made clear.

To the backs of the panels 1, 47 and 51 is glued a strip 53, to which strip 53 is hinged a support 57. A crease 55 forms the hinge for said support 57. The support 57 is not glued to the said panels but is adapted to be folded up against them. Crease lines 59 formed across the portions 53 and 57 are adapted to closely parallel said crease lines 45 and 49. A tab 61, cut from the support along lines 63 and 65 and hinged thereto on a crease 67, is adapted to be placed at right angles to the support 57 when said support is placed at right angles to the panels 1, 47 and 51, thereby to hold the support in the said right angular position. It should be noted that the strips 53 and 57 are flush with the bottom-and-back crease 7.

In order to fold the box flat for primary shipment to a wholesaler, the end panels 23 and 25 and parts therewith are folded inwardly on the creases 27 and 29. The bottom panel with the said ends 23 and 25 is then folded up on crease 7 against the upper elements 1, 47 and 51. The ends 23 and 25 and parts therewith are thus held between the rails 13, 15, bottom 9, and the panels 1, 47, 51. The support 57 and the tab 61 therewith are laid flat against said last named panels. Hence a compact and flat shipping package is had (see Fig. 2).

Figs. 3 to 5 illustrate a display assembly of the box. Assembly is accomplished by simultaneously turning up the panels 1, 47 and 51 and the rails 13, 15 with the buttresses 19 and 21. The bottom 9 is left flat on the assembly surface. The end portions 23 and 25 are then swung inwardly in the directions indicated by arrows in Figs. 3 and 6. The lower flaps 35 are positioned above the bottom 9, thereby closing the openings left where the buttresses 19 and 21 were cut out at incisions 14.

The flaps 37 are positioned behind the vertical back panel 1 and the pairs of tongues 39 and 41 are made to cooperate with the pairs of slots 3 and 5 respectively (Figs. 3 to 6). The open box or container thus formed by the bottom 9, back 1, ends 23, 25 and rails 13, 15, may now be loaded with merchandise. The present embodiment is adapted to receive a row of tobacco tins, one of which tins T is illustrated in place in Fig. 6. The tins are preferably to be filled with tobacco and ready for sale. The flaps 33 are folded down over the end tins.

Next the box may be either set to display position or closed for shipment with its contents of merchandise.

If it is to be closed the support 57 and its tab 61 are left flat against the panels 1, 47 and 51 (Fig. 6). The top panel 47 is folded down on the crease 45 to act as a cover and the closure panel 51 is hinged on the crease 49 to form a front closure and lie against the rails 13, 15 and buttresses 19, 21. The strips 53 and 57, due to the creases 59, fold over with the panels and act as an effective stiffening band B for the closed box. A cord or outside wrapper may finally be employed to hold the box shut or a group of boxes may be fitted into a larger carton whereby they hold one another shut. The compactness of the closed boxes is evident.

In order to place a box (full of merchandise) into display position, it is only necessary to lift the display and closure panels 47, 51 from the closed position, through the Fig. 6 position, to a vertical, single-plane position shown in Figs. 3 to 5. The support 57 is then folded back at ninety degrees and the tab 61 pushed down. The result is that the support acts as an effective stiffener to the relatively large display area. The stiffening effect of said support 57 is not decreased for the purpose in hand because of the creases 59. This is evident from the mechanics of the structure (see Figs. 3 to 5), the member 57 acting as a tension and compression strut in the plane of the creases. It traverses the hinges of the display panels.

The effectiveness of the display areas 47, 51 when the actual merchandise is juxtapositioned, coupled with the ease with which the box may be opened to, or closed from a rigid display position of stable equilibrium, makes the device a desirable one for shipping and display purposes. Furthermore, the ease with which it may be assembled from its flat original shipping position, taken in conjunction with its ease of manufacture, provides for the improved display box almost the economy of a plain non-display box. Its material comprises ordinary sheeting such as patent coated manilla of suitable thickness for the size of box desired.

In Figs. 7 to 12 is illustrated a modified one-piece form of the box. In this form the elements 1, 9, 13, 15, 17, 19, 21, 23, 25, 33, 35, 47 and 51 are retained as well as the creases, score lines, and gluing between rails 13 and 15 therewith. The former flaps 37 are eliminated as are the hinged support strips 53, 57, and the horizontal pairs of slots 3 and 5.

The substitution for the former glued strips 53, 57 comprises panels 69, 71 hinged sidewardly to said display and closure panels 1, 47, 75. These panels 69, 71 are hinged on creases 73, 75 respectively, and are adapted to fold back against said panels 1, 47, 51. Creases 77 on the supporting panels 69, 71 extend linearly from the said creases 45, 49 and provide means whereby the panels 67, 71 may fold with the panels 1, 47, 51 when laid back thereon.

In place of the flaps 37, the ends 23, 25 are directly provided with pairs of tongues 79, 81 respectively hinged on pairs of creases 83, 85. These pairs of tongues 79 and 81 are adapted to engage pairs of notches 85 and 87 formed in line with the lower portions of the creases 73 and 75. The notches 85, 87 are adapted to be engaged by the tongues 79, 81 from the front. Openings or holes 89 are formed at the junctures of creases 45, 49, 73, 75 and 77 for purposes of relieving the material when folds are made.

Fig. 8 illustrates the flat folded shipping position which is similar to that for the preferred form. The supporting panels 69, 71 are folded flatly back against the panels 1, 47, 51.

In order to assemble the modified form to a box-like or container shape, correspondparts are manipulated as were parts in the preferred form. However, the tongues 79 and 81 are not brought through the slots 85 and 87 from the rear but from the front (Figs. 9 and 10). This is because the wings or supports 69 and 71 interfere with the former method.

In order to close the assembled alternate form, the panels 69 and 71 are folded back on the panels 1, 47, 51. The panels 1, 47, 51 and 69, 71 may then all be folded down as illustrated in Fig. 12. The supporting members 69, 71 again act as stiffening bands C around the closed and packed box.

The alternate form is put into display position by opening it from the closed position, through the Fig. 12 position and to the Figs. 9–11 position. The panels 47, 51 are lifted vertically and the supporting display panels 69, 71 are swung forwardly. They are permitted to retain an angular position with respect to the panels 1, 47, 51, whence the latter panels are held stiffly in a single display panel. The supporting panels 69, 71 are also held stiff by the display panels, that is the groups of panels 1, 47, 51 and 69, 71 hold each other stiff when they are substantially in non-parallel planes; otherwise not. It should be noted that the lower edges of the panels 69, 71 are formed horizontally flush with the bottom of the box.

The advantages accruing to the preferred form, also accrue to this latter one. Furthermore the last-described device is made from a single sheet of material. The supports 69 and 71 also add display area, thus performing an added function.

From the above it will be seen that the several objects of the invention are attained and other advantageous results achieved.

As many modifications of the embodiments above illustrated might be made without departing from the spirit or scope of the present invention, it is intended that the above description and accompanying drawings and claims shall be interpreted as illustrative and not in a limiting sense.

I claim:

1. A display box comprising a collapsible container having an opening at its forward side for displaying merchandise therein, end panels and a back portion therefor, a cover panel hinged to the back portion and a closure panel hinged to said cover panel, the cover panel being adapted for closing the top of the container and the closure panel being adapted for closing said forward opening, means for maintaining the back portion, cover, and closure panels open and in a single plane, comprising at least one support hinged to said last three members in a position traversing their hinging means, means for holding the support in traversing position to brace said three members, said support hinging means permitting collapse of the support against said three members and means permitting its movement to a folded position with said three members as they are put into a closing position, whereby the support is used as a stiffening band.

2. A display box comprising a container, a hinged closing means therefor having hinged panels, at least one supporting member hinged to the closing means, said supporting member being adapted to fold against and with the closing means for closing purposes to form a stiffening band when the box is closed, and being adapted to be struck angularly with respect to and across the hinged panels of the closing means in order to stiffen said panels and hold them in a predetermined hinged position.

3. A display box comprising a container, a wall portion therefor, a cover panel hinged to said wall portion and a second panel hinged to said cover panel, means for maintaining the wall portion, cover and said second panel open and in a predetermined display position comprising two integrally formed supports hinged at the ends of said last three members along a line traversing their hinges, said supports being adapted to fold open to form display panels and brace the cover panel and second panel in display position and to fold against said last-named panels to form stiffening bands when said last-named panels are folded to enclose the container.

4. A display box comprising a one-piece collapsible container, a wall portion therefor and an open display portion therefor, a cover panel hinged to said wall portion and closure panel hinged to the cover panel, the cover panel being adapted to close the top of the container and the closure panel for closing said open display portion, means for maintaining the wall portion, cover and closure panels open and in a predetermined display position, comprising two integrally formed supports hinged at the ends of the wall and panel portions, said supports being adapted to fold open to form display panels and brace the last-named portions in display position and to fold against and with said last-named portions for closing purposes.

In testimony whereof, I have signed my name to this specification this 17th day of April, 1926.

GEORGE HORNECKER.